(12) United States Patent
Morrison

(10) Patent No.: US 7,666,475 B2
(45) Date of Patent: Feb. 23, 2010

(54) METHOD FOR FORMING INTERPHASE LAYERS IN CERAMIC MATRIX COMPOSITES

(75) Inventor: Jay Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 911 days.

(21) Appl. No.: 11/012,954

(22) Filed: Dec. 14, 2004

(65) Prior Publication Data

US 2009/0280257 A1 Nov. 12, 2009

(51) Int. Cl.
*C23C 16/00* (2006.01)

(52) U.S. Cl. ............. 427/249.2; 427/249.3; 427/249.4; 427/249.15; 427/249.16

(58) Field of Classification Search ............. 427/249.2, 427/249.3, 249.4, 249.15, 249.16
See application file for complete search history.

(56) References Cited

U.S. PATENT DOCUMENTS

| | | | |
|---|---|---|---|
| 4,134,759 A | 1/1979 | Yajima et al. | |
| 4,830,919 A | 5/1989 | Shuford | |
| 5,360,638 A | 11/1994 | Lequertier | |
| 5,514,474 A | 5/1996 | Morgan et al. | |
| 5,871,838 A | 2/1999 | Klett et al. | |
| 5,900,297 A | 5/1999 | Rudolph et al. | |
| 5,948,516 A | 9/1999 | Kriven et al. | |
| 5,961,661 A * | 10/1999 | Jessen | 264/610 |
| 6,030,698 A | 2/2000 | Burchell et al. | |
| 6,121,169 A | 9/2000 | Carpenter et al. | |
| 6,218,324 B1 | 4/2001 | Gooltjar | |
| 6,284,357 B1 | 9/2001 | Lackey et al. | |
| 6,506,502 B2 | 1/2003 | Lo et al. | |
| 6,607,645 B1 | 8/2003 | Sarkar | |
| 6,713,198 B2 | 3/2004 | Yamada et al. | |
| 2003/0207155 A1 * | 11/2003 | Morrison et al. | 428/699 |
| 2004/0058154 A1 | 3/2004 | Lau et al. | |

FOREIGN PATENT DOCUMENTS

EP 1 006 446 A2 6/2000

* cited by examiner

*Primary Examiner*—Binh X Tran

(57) ABSTRACT

A method for forming interphase layers in ceramic matrix composites. The method forms interphase layers in ceramic matrix composites thereby enabling higher matrix densities to be achieved without sacrificing crack deflection and/or toughness. The methods of the present invention involve the use fugitive material-coated fibers. These fibers are then infiltrated with a ceramic matrix slurry. Then, the fugitive material is removed and the resulting material is reinfiltrated with an interphase layer material. The ceramic matrix composite is then fired. Additional steps may be included to densify the ceramic matrix or to increase the strength of the interphase layer. The method is useful for the formation of three dimensional fiber-reinforced ceramic matrix composites envisioned for use in gas turbine components.

14 Claims, No Drawings

METHOD FOR FORMING INTERPHASE LAYERS IN CERAMIC MATRIX COMPOSITES

FIELD OF THE INVENTION

This invention is directed generally to ceramic materials, and more particularly to ceramic matrix composites.

BACKGROUND

The brittleness and unreliability of ceramics in certain applications continue to present difficult and unsolved problems. The aerospace, automotive and aviation industries are but a few examples of industries that are searching for enabling technology to introduce new types of ceramics that are tough, flaw tolerant and exhibit graceful failure and creep resistance for both ambient and high temperature applications. Typical applications include components in turbine engines, cylinder sleeves for gasoline engines and structural components.

Recent trends in the ceramics research have been to reinforce brittle ceramic matrices with higher elastic modulus fibers, platelets, particulates, or whisker-shaped reinforcing elements embedded in the matrix. The reinforcing elements impart additional strength to the ceramic matrix. The additional strength is necessary to maintain the structural integrity of the ceramic matrices, particularly upon stress or shear-induced defects. These embedded reinforcing elements constitute large amounts of interfacial surface inside the ceramic composite. The deflection of a crack along such an interface causes separation of the interface due to the action of an impinging crack and is an important mechanism for enhancing the fracture toughness of the ceramic matrices. In a fiber-reinforced matrix, for example, the advancing crack can directly advance through the fiber potentially destroying the ceramic or it can debond along the interface and inhibit fiber failure. If debonding occurs, then the intact fibers will allow crack bridging and eventual fiber pull-out, thus giving rise to increased toughness of the composite.

It has been demonstrated that extensive fiber pullout can be induced by formation of a weak interphase layer between the fiber and the ceramic matrix. This has led to investigations of a variety of composites with coated fibers. This type of interfacial debonding mechanism of toughening has clearly been demonstrated in SiC materials reinforced with SiC fibers that were previously coated with a thin layer of compliant graphite (C) or boron nitride (BN). Toughness values of up to 30 MPa $m^{1/2}$ have been reported for the graphite system when it operates under vacuum and ambient temperature. Alternating laminates of silicon carbide (SiC) and graphite have also functioned well in controlled oxygen deficient atmospheres. However, for high temperature applications (greater than 1000° C.), for extended use (greater than ten hours), or in air or oxidizing environments, both silicon carbide and graphite are chemically unstable and decompose to silica ($SiO_2$) and gaseous species, e.g., carbon monoxide (CO). The resulting ceramic body is left porous, friable and weak.

Interphase layers are generally used to achieve the highest performance potential of ceramic matrix composites (CMC). Commercially available oxide CMCs (such as A/N720 from COI Ceramics, Inc.) do not rely on such interphases, but instead achieve crack deflection mechanisms using a porous, weak matrix. This weak matrix results in poor interlaminar properties, which tends to be a design-limiting feature. Higher matrix and interlaminar strengths may be achieved by increased densification, but at the sacrifice of crack deflection mechanisms and in-plane strain capability.

Interphase layers (such as monazite and porous zirconia) have been developed specifically for oxide matrix CMCs, but current application methods preclude their use in 3D reinforced fiber architectures.

Current methods for depositing coatings follow three paths. A first method involves the coating of fiber tows or fabrics. This method results in good quality, uniform coatings, but the coatings are not robust enough to withstand weaving or processing.

A second method involves the coating of fiber preforms. This method results in less uniform coatings; subsequent infiltration of matrix (especially within fiber bundles), and/or is inhibited by the presence of the coating.

A third method involves the introduction of an interphase material with the matrix. This method, also known as the Rockwell approach, mixes monazite and alumina, which compromises matrix strength since monazite is weak and prevents alumina particles from bonding.

Accordingly, what is needed is method for forming in-situ interphase layers in ceramic matrix composites that achieves uniform fiber coatings. Also what is needed is method for forming in-situ interphase layers in ceramic matrix composites that achieves high matrix strength in a three dimensional fiber preform.

SUMMARY OF THE INVENTION

This present invention provides method for forming interphase layers in ceramic matrix composites. The methods of the present invention form interphase layers in ceramic matrix composites that overcome the current obstacles faced in the prior art in forming such layers. Interphase layers are beneficial for next generation oxide ceramic matrix composites to prevent bonding between the matrix and fiber. This enables higher matrix densities to be achieved without sacrificing crack deflection and/or toughness. The methods of the present invention involve the use fugitive material-coated fibers. These fibers are then infiltrated with a ceramic matrix slurry. Then, the fugitive material is removed and the resulting material is reinfiltrated with an interphase layer material. The ceramic matrix composite is then fired. Additional steps may be included to densify the ceramic matrix or to increase the strength of the interphase layer. The method is particularly useful for three dimensional (3D) fiber-reinforced ceramic matrix composites envisioned for use in gas turbine components. Examples of such components include, but are not limited to, vanes and airfoils.

These and other embodiments are described in more detail below.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method for forming in-situ interphase layers in ceramic matrix composites. The method of the present invention form interphase layers in ceramic matrix composites (CMCs) that overcome the current difficulties in forming such layers. Interphase layers are beneficial for next generation oxide CMCs to prevent bonding between the matrix and fiber, thus enabling higher matrix densities to be achieved without sacrificing crack deflection and toughness. The methods of the present invention involve the use fugitive material-coated fibers. These fibers are then infiltrated with the ceramic matrix slurry. Then, the fugitive material is removed, such as by burning out of the fugitive material, and the resulting material is reinfiltrated with an interphase layer material. The method is particularly useful for three dimensional (3D) fiber reinforced CMCs envisioned for use in gas turbine components. Examples of such components include, but are not limited to, vanes and airfoils.

In one aspect of the present invention, the methods of forming the interphase layers achieves a substantially uniform fiber coating. In another aspect, the methods of the present invention achieve CMCs having high matrix strength in a 3D fiber preform. The methods of the present invention achieve one or more of these aspects using a plurality of steps.

In a first embodiment, a fiber preform is coated with a fugitive material. The fiber may be any ceramic material, such as alumina (aluminum oxide—$Al_2O_3$). Other ceramic materials that may be used in the present invention include, but are not limited to, graphite, silicon, ceria, zirconia, glass, silicon carbide, silicon nitride, sapphire, cordierite, mullite, magnesium oxide, zirconium oxide, boron carbide, scandium oxide, hafnium oxide, yttrium oxide, spinel, garnet, boron nitride, quartz, or combinations thereof, as well as any other crystalline inorganic nonmetallic material.

The ceramic fiber is coated with a fugitive material. As used herein, a "fugitive" material is any material that is not intended to remain as part of the final CMC composite and can be removed at an intermediate processing step without damage to the structure. Such materials include graphite, various organic compounds, waxes, etc. and may even include typical sizing agents applied by manufacturers to protect the fibers (such as polyvinyl alcohol (PVA)). Removal methods for the fugitive material include oxidizing or burning, chemical etching, thermal decomposition, etc.

In one embodiment, the fugitive material is an electrically conductive material. such as carbon, graphite, an electrically-conductive organic solution, or a combination thereof. Coating of ceramic fibers in the preform stage may, in one embodiment, be readily achieved using a pyrolytic carbon processes, which results in a conductive source for depositing electrostatically charged particles. It is to be noted, however, that if the fiber material is already electrically conductive, the use of an electrically conductive material coating becomes optional.

Once the fiber preform has been coated with a fugitive material, the coated fiber preform is infiltrated with a ceramic matrix slurry. In one embodiment, this is achieved using an electrophoretic deposition processes. Electrophoretic deposition processes (EDP) may be used to effectively infiltrate fiber tows and fabrics with ceramic powders, resulting in high density particle packing and green densities. In one embodiment, a standard EPD process is utilized. A standard EPD process uses an electrical potential across the fabric or preform. As such, this process may be limited based upon the thickness of the fiber preform. Infiltration of thick preforms may be easily achieved for conductive fibers. For non-conducting fibers, such as most high temperature metal oxides, the use of a conductive coatings is utilized to permit the use of the EDP. It should be noted that, in alternative embodiments, the infiltration of the fiber preform with the ceramic matrix slurry may be achieved using other process besides EDP including, but not limited to, pressure- or vacuum-assisted slurry impregnation, resin transfer molding, etc.

In select embodiments, it may be beneficial to densify the matrix. "Densification" of the matrix refers to either 1) an increase in the amount of ceramic matrix material that is infiltrated within the fiber perform and/or 2) increasing the sintering activity of the existing matrix to increase densification upon sintering. The latter can be achieved, e.g., by sintering aids or by increasing firing temperatures. Densification of the matrix may be accomplished by first infiltrating with the matrix slurry followed by drying and/or curing of the composite to a temperature below the oxidation temperature of the fugitive material. Then, reinfiltration of the matrix using either additional slurry or a colloidal suspension or other ceramic precursors is performed. The fugitive material, such as carbon, serves to protect fibers from exposure to the chemicals and acids in the matrix processing, to which oxide fibers are especially susceptible.

Once the fiber preform has been infiltrated with the ceramic matrix material and the selected density of the ceramic matrix material has been achieved, the coating of the fugitive material, if any, that was applied to the fiber preform may then be removed. In one embodiment, wherein the fugitive material was carbon, the removal of the fugitive material may be done by simply exposing the material to an oxidizing environment at greater than about 600° C. for a sufficient period of time to burn off the carbon. This burn off time may be several hours.

Once the fugitive material has been removed, the interphase material is infiltrated into the space left behind by the burned-off fugitive material. The interphase material infiltrates residual porosity in the CMC thereby leaving a weak interphase layer between a highly dense matrix and fibers. This weak interphase layer promotes crack deflection and/or helps to prevent bonding between the matrix and the fiber. This enables higher matrix densities to be achieved without sacrificing crack deflection and/or toughness.

Examples of interphase materials that may be used in the present invention include, but are not limited to, monazite, zirconia, beta-hexyluminates, germanates, or combinations thereof.

Once the interphase material is been infiltrated within the CMC, the CMC may then be fired to achieve the final density. The infiltration step may be repeated as often as beneficial based upon the selected final properties of the CMC. For example, in one embodiment, additional interphase material may be infiltrated to increase the matrix strength. Alternatively, in another embodiment, additional matrix precursor material may be used to increase the density of the final CMC material. After such infiltration, the CMC may then be fired.

In an alternative embodiment, the final two steps may be alternated. As such, a firing step may follow the removal of the fugitive material, leaving a void space between the preform fiber and the ceramic matrix material and then subsequently filling that space with interphase material and another firing step.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A method for forming an interphase layer in a ceramic matrix composite comprising the steps of:
   coating a fiber preform with a fugitive material;
   infiltrating the coated fiber preform with a ceramic matrix material;

burning off substantially all of the fugitive material to produce at least one void space between the fiber preform and the ceramic matrix material;

infiltrating the at least one void space with an interphase material, thereby forming an interphase layer positioned between the ceramic matrix material and the fiber preform; and firing the ceramic matrix composite, wherein said interphase material is selected from monazite, porous zirconia, beta-hexyluminates, germanates, and combinations thereof.

2. The method of claim 1, wherein the fiber preform comprises a ceramic fiber selected from, graphite, silicon, alumina, zirconia, glass, ferrites, silicon carbide, silicon nitride, sapphire, cordierite, mullite, magnesium oxide, zirconium oxide, boron carbide, tin oxide, scandium oxide, hafnium oxide, yttrium oxide, spinel, garnet, boron nitride, quartz, forsterlte or combinations thereof.

3. The method of claim 1, wherein the fugitive material is selected from carbon, graphite, an electrically-conductive organic solution, or a combination thereof.

4. The method of claim 1, wherein said interphase material is selected from monazite, beta-hexyluminates, germanates, or combinations thereof.

5. The method of claim 1, further comprising the steps of:
curing the coated fiber preform infiltrated with the ceramic matrix material; and
reinfiltrating the cured coated fiber preform infiltrated with the ceramic matrix material with additional ceramic matrix material prior to the step of burning off substantially all of the fugitive material.

6. The method of claim 1, further comprising the steps of:
reinfiltrating the ceramic matrix composite with additional interphase material after the ceramic matrix composite has been fired; and
refiring the ceramic matrix composite.

7. The method of claim 1, further comprising the steps of:
reinfiltrating the ceramic matrix composite with additional ceramic matrix material after the ceramic matrix composite has been fired; and
refiring the ceramic matrix composite.

8. A method for forming an interphase layer in a ceramic matrix composite comprising the steps of:
coating a fiber preform with a fugitive material;
infiltrating the coated fiber preform with a ceramic matrix material;
burning off substantially all of the fugitive material to produce at least one void space between the fiber preform and the ceramic matrix material;
firing the ceramic matrix composite;
infiltrating the at least one void space with an interphase material, thereby forming an interphase layer positioned between the ceramic matrix material and the fiber preform; and
refiring the ceramic matrix composite, wherein the interphase material is selected from monazite, porous zirconia, beta-hexyluminates, germanates, and combinations thereof.

9. The method of claim 8, wherein the fiber preform comprises a ceramic fiber selected from, graphite, silicon, alumina, zirconia, glass, ferrites, silicon carbide, silicon nitride, sapphire, cordierite, mullite, magnesium oxide, zirconium oxide, boron carbide, tin oxide, scandium oxide, hafnium oxide, yttrium oxide, spinel, garnet, boron nitride, quartz, forsterlte or combinations thereof.

10. The method of claim 8, wherein the fugitive material is selected from carbon, graphite, an electrically-conductive organic solution, or a combination thereof.

11. The method of claim 8, wherein the interphase material is selected from monazite, beta-hexyluminates, germanates, or combinations thereof.

12. The method of claim 8, further comprising the steps of:
curing the coated fiber preform infiltrated with the ceramic matrix material; and
reinfiltrating the cured coated fiber preform infiltrated with the ceramic matrix material with additional ceramic matrix material prior to the step of burning off substantially all of the fugitive material.

13. The method of claim 8, further comprising the steps of:
reinfiltrating the ceramic matrix composite with additional interphase material after the ceramic matrix composite has been refired; and
refiring the ceramic matrix composite.

14. The method of claim 8, further comprising the steps of:
reinfiltrating the ceramic matrix composite with additional ceramic matrix material after the ceramic matrix composite has been refired; and
refiring the ceramic matrix composite.

\* \* \* \* \*

UNITED STATES PATENT AND TRADEMARK OFFICE
CERTIFICATE OF CORRECTION

PATENT NO. : 7,666,475 B2 Page 1 of 1
APPLICATION NO. : 11/012954
DATED : February 23, 2010
INVENTOR(S) : Jay Morrison It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Twenty-eighth Day of December, 2010

David J. Kappos
*Director of the United States Patent and Trademark Office*